(12) United States Patent
Siegel et al.

(10) Patent No.: US 10,870,609 B2
(45) Date of Patent: Dec. 22, 2020

(54) REACTIVE INORGANIC COATINGS FOR AGRICULTURAL FERTILIZERS

(71) Applicant: Anuvia Plant Nutrients Corporation, Zellwood, FL (US)

(72) Inventors: Sanford A. Siegel, Bradenton, FL (US); Jeffrey C. Burnham, Marco Island, FL (US)

(73) Assignee: Anuvia Plant Nutrients Corporation, Winter Garden, FL (US)

( * ) Notice: Subject to any disclaimer, the term of this patent is extended or adjusted under 35 U.S.C. 154(b) by 0 days.

(21) Appl. No.: 16/543,071

(22) Filed: Aug. 16, 2019

(65) Prior Publication Data

US 2020/0055794 A1 Feb. 20, 2020

Related U.S. Application Data

(60) Provisional application No. 62/718,993, filed on Aug. 16, 2018.

(51) Int. Cl.
*C05G 5/30* (2020.01)
*C05F 3/00* (2006.01)
(Continued)

(52) U.S. Cl.
CPC ............... *C05G 5/30* (2020.02); *C05D 9/02* (2013.01); *C05F 3/00* (2013.01); *C05F 5/002* (2013.01); *C05G 5/12* (2020.02)

(58) Field of Classification Search
None
See application file for complete search history.

(56) References Cited

U.S. PATENT DOCUMENTS

| 143,310 A | 2/1856 | Storer |
| 2,026,969 A | 1/1936 | Flynn et al. |

(Continued)

FOREIGN PATENT DOCUMENTS

| DE | 2523628 | 12/1976 |
| DE | 2800915 | 9/1978 |

(Continued)

OTHER PUBLICATIONS

U.S. Appl. No. 62/621,284, filed Jan. 24, 2018.*

(Continued)

*Primary Examiner* — Wayne A Langel
(74) *Attorney, Agent, or Firm* — Remenick PLLC

(57) ABSTRACT

The invention relates to a coated granular fertilizer, preferably wherein granules are sulfate-based or phosphate-based. When sulfate based granules, as in ammonium sulfate, the coating substance is an inorganic salt of alkaline earth elements, preferably calcium, such that when applied to the surface of fertilizers, forms calcium sulfate, preferably a calcium sulfate-dihydrate, as a protective coating. For a reactive coating of a thiosulfate, free sulfuric acid present on the granule reacts to provide an elemental sulfur coating. For ammonium phosphate-based granules, coatings may comprise compounds of $Ca^{++}$, $Al^{+++}$ and/or $Fe^{+++}$ salts thereby forming a calcium, an aluminum, an iron, or mixed cation phosphate protective coating. Thiosulfate is also effective with phosphate based granules which are manufactured with sulfuric acid. Granules coated according to the disclosure have advantageous properties as the coating can be applied in a specified and sparing manner due to its tendency to adhere to surfaces during the reaction. Coated fertilizer granules of the disclosure are also advantageous in that, with regard to the applied amount of coating, they provide increased resistance to dusting in long term warehouse (Continued)

storage, to moisture uptake and to oxidative heating. Coating components also add nutrients to plants that can provide nutrients over a longer period of time such as a slow-release characteristic.

64 Claims, 3 Drawing Sheets

(51) Int. Cl.
*C05D 9/02* (2006.01)
*C05G 5/12* (2020.01)
*C05F 5/00* (2006.01)

(56) References Cited

U.S. PATENT DOCUMENTS

| | | |
|---|---|---|
| 2,568,901 A | 9/1951 | Stengel et al. |
| 2,662,881 A | 12/1953 | Batdorf et al. |
| 2,755,176 A | 7/1956 | Pearce et al. |
| 2,800,457 A | 7/1957 | Green et al. |
| 2,800,458 A | 7/1957 | Green et al. |
| 2,864,685 A | 12/1958 | Waters et al. |
| 2,902,342 A | 9/1959 | Kerley et al. |
| 3,050,383 A | 8/1962 | Wilson et al. |
| 3,259,482 A | 7/1966 | Hansen et al. |
| 3,264,088 A | 8/1966 | Hansen et al. |
| 3,264,089 A | 8/1966 | Hansen et al. |
| 3,304,588 A | 2/1967 | Mcilvaine et al. |
| 3,345,288 A | 10/1967 | Heinrich et al. |
| 3,475,154 A | 10/1969 | Kato et al. |
| 3,476,683 A | 11/1969 | Liljegren et al. |
| 3,655,395 A | 4/1972 | Karnemaat et al. |
| 3,756,784 A | 9/1973 | Pittwood |
| 3,796,669 A | 3/1974 | Kiritani et al. |
| 3,837,872 A | 9/1974 | Conner |
| 3,915,853 A | 10/1975 | Luck |
| 3,939,280 A | 2/1976 | Karnemaat |
| 3,942,970 A | 3/1976 | O'Donnell |
| 3,960,718 A | 6/1976 | Lebo |
| 3,966,450 A | 6/1976 | O'Neill et al. |
| 4,001,140 A | 1/1977 | Foris et al. |
| 4,076,515 A | 2/1978 | Rickard |
| 4,079,003 A | 3/1978 | Manchak |
| 4,100,103 A | 7/1978 | Foris et al. |
| 4,108,771 A | 8/1978 | Weiss |
| 4,124,405 A | 11/1978 | Quienot |
| 4,134,750 A | 1/1979 | Norton et al. |
| 4,154,593 A | 5/1979 | Brown et al. |
| 4,180,459 A | 12/1979 | Zievers |
| 4,219,347 A | 8/1980 | Young |
| 4,230,568 A | 10/1980 | Chappell |
| 4,249,929 A | 2/1981 | Kneer |
| 4,270,279 A | 6/1981 | Roediger |
| 4,304,588 A | 12/1981 | Moore, Jr. |
| 4,306,978 A | 12/1981 | Wurtz |
| 4,377,406 A | 3/1983 | Achorn et al. |
| 4,377,486 A | 3/1983 | Barrick et al. |
| 4,405,354 A | 9/1983 | Thomas, II et al. |
| 4,454,259 A | 6/1984 | Reischl et al. |
| 4,500,428 A | 2/1985 | Lynch et al. |
| 4,514,307 A | 4/1985 | Chestnut et al. |
| 4,519,831 A | 5/1985 | Moore |
| 4,541,986 A | 9/1985 | Schwab et al. |
| 4,554,002 A | 11/1985 | Nicholson |
| 4,601,863 A | 7/1986 | Shioi et al. |
| 4,619,684 A | 10/1986 | Salladay et al. |
| 4,655,932 A | 4/1987 | Roslonski |
| 4,659,472 A | 4/1987 | Nordlund et al. |
| 4,711,659 A | 12/1987 | Moore |
| 4,743,287 A | 5/1988 | Robinson |
| 4,772,490 A | 9/1988 | Kogler et al. |
| 4,781,842 A | 11/1988 | Nicholson |
| 4,786,307 A | 11/1988 | Marihart |
| 4,792,349 A | 12/1988 | Trimm et al. |
| 4,793,927 A | 12/1988 | Meehan et al. |
| 4,902,431 A | 2/1990 | Nicholson et al. |
| 4,966,706 A | 10/1990 | Gregor |
| 4,997,572 A | 3/1991 | Wurtz |
| 5,013,458 A | 5/1991 | Christy, Sr. et al. |
| 5,051,031 A | 9/1991 | Schumacher et al. |
| 5,087,375 A | 2/1992 | Weinwurm |
| 5,102,556 A | 4/1992 | Wong |
| 5,118,337 A | 6/1992 | Bleeker |
| 5,125,951 A | 6/1992 | Lahoda et al. |
| 5,135,664 A | 8/1992 | Burnham |
| 5,147,563 A | 9/1992 | Long, Jr. et al. |
| 5,183,577 A | 2/1993 | Lehmann |
| 5,238,480 A | 8/1993 | Rehberg et al. |
| 5,252,116 A | 10/1993 | Markham et al. |
| 5,259,977 A | 11/1993 | Girovich et al. |
| 5,275,733 A | 1/1994 | Burnham |
| 5,340,376 A | 8/1994 | Cunningham |
| 5,342,442 A | 8/1994 | Nechvatal et al. |
| 5,346,527 A | 9/1994 | Rehbein et al. |
| 5,356,540 A | 10/1994 | Khan et al. |
| 5,385,673 A | 1/1995 | Fergen |
| 5,393,317 A | 2/1995 | Robinson |
| 5,401,402 A | 3/1995 | Christy et al. |
| 5,409,605 A | 4/1995 | Haley et al. |
| 5,417,861 A | 5/1995 | Burnham |
| 5,419,839 A | 5/1995 | Haley et al. |
| 5,422,015 A | 6/1995 | Angell et al. |
| 5,435,923 A | 7/1995 | Girovich |
| 5,443,613 A | 8/1995 | Robinson |
| 5,466,273 A | 11/1995 | Connell |
| 5,500,044 A | 3/1996 | Meade et al. |
| 5,554,279 A | 9/1996 | Christy |
| 5,556,445 A | 9/1996 | Quinn et al. |
| 5,580,458 A | 12/1996 | Yamasaki et al. |
| 5,593,590 A | 1/1997 | Steyskal |
| 5,593,591 A | 1/1997 | Ohsol et al. |
| 5,603,842 A | 2/1997 | Whitaker et al. |
| 5,618,442 A | 4/1997 | Christy |
| 5,635,069 A | 6/1997 | Boss et al. |
| 5,669,969 A | 9/1997 | Meade et al. |
| 5,679,129 A | 10/1997 | Hon |
| 5,681,481 A | 10/1997 | Christy et al. |
| 5,722,721 A | 3/1998 | Batoff et al. |
| 5,733,355 A | 3/1998 | Hibino et al. |
| 5,766,302 A | 6/1998 | Lefroy et al. |
| 5,783,073 A | 7/1998 | Christy et al. |
| 5,807,724 A | 9/1998 | Resnick |
| 5,849,060 A | 12/1998 | Diping et al. |
| 5,853,450 A | 12/1998 | Burnham et al. |
| 5,853,590 A | 12/1998 | Burnham |
| 5,862,610 A | 1/1999 | Lipert |
| 5,876,613 A | 3/1999 | Bonnin et al. |
| 5,906,750 A | 5/1999 | Haase |
| 5,916,448 A | 6/1999 | Fergen |
| 5,984,992 A | 11/1999 | Greer et al. |
| 5,993,505 A | 11/1999 | Tijsma et al. |
| 6,030,659 A * | 2/2000 | Whitehurst ............ C05B 17/00 427/214 |
| 6,051,411 A | 4/2000 | Turtakovsky et al. |
| 6,103,191 A | 8/2000 | Luker |
| 6,117,406 A | 9/2000 | Vogel et al. |
| 6,159,263 A | 12/2000 | Greer et al. |
| 6,165,550 A | 12/2000 | Markusch et al. |
| 6,176,891 B1 | 1/2001 | Komoriya et al. |
| 6,187,074 B1 | 2/2001 | von Locquenghien et al. |
| 6,237,246 B1 | 5/2001 | Millard |
| 6,237,264 B1 | 5/2001 | Gulick, Jr. |
| 6,256,902 B1 | 7/2001 | Flaherty et al. |
| 6,284,278 B1 | 9/2001 | Waldman et al. |
| 6,325,035 B1 | 12/2001 | Codina et al. |
| 6,331,300 B1 | 12/2001 | Dybas et al. |
| 6,398,840 B1 | 6/2002 | Orta-Castro et al. |
| 6,406,510 B1 | 6/2002 | Burnham |
| 6,409,788 B1 | 6/2002 | Sower |
| 6,409,789 B1 | 6/2002 | Gilbert |
| 6,461,399 B1 | 10/2002 | Connell |
| 6,465,706 B1 | 10/2002 | Rogers et al. |
| 6,517,599 B2 | 2/2003 | Gilbert |

(56) References Cited

U.S. PATENT DOCUMENTS

| | | | |
|---|---|---|---|
| RE38,238 E | 8/2003 | Nicholson et al. | |
| 6,623,650 B2 | 9/2003 | Millard | |
| 6,666,154 B2 | 12/2003 | Logan et al. | |
| 6,716,360 B2 | 4/2004 | Titmas | |
| 6,752,848 B2 | 6/2004 | Logan et al. | |
| 6,752,849 B2 | 6/2004 | Logan et al. | |
| 6,758,879 B2 | 7/2004 | Greer et al. | |
| 6,841,515 B2 | 1/2005 | Burnham | |
| 6,852,142 B2 | 2/2005 | Varshovi | |
| 6,966,941 B1 | 11/2005 | Grobler et al. | |
| 7,128,880 B2 | 10/2006 | Dahms et al. | |
| 7,497,956 B2 | 3/2009 | Blais et al. | |
| 7,513,927 B2 | 4/2009 | Faulmann et al. | |
| 7,604,742 B2 | 10/2009 | Shankar et al. | |
| 7,662,205 B2 | 2/2010 | Burnham | |
| 7,789,931 B2 | 9/2010 | Burnham et al. | |
| 7,947,104 B2 | 5/2011 | Burnham et al. | |
| 7,947,105 B2 | 5/2011 | Burnham | |
| 8,057,569 B2 | 11/2011 | Burnham et al. | |
| 8,105,413 B2 | 1/2012 | Burnham | |
| 8,202,342 B2 | 6/2012 | Burnham | |
| 8,470,065 B1 | 6/2013 | Burnham | |
| 8,557,013 B2 | 10/2013 | Burnham et al. | |
| 8,597,394 B2 | 12/2013 | Burnham | |
| 8,864,868 B2 | 10/2014 | Burnham | |
| 8,920,733 B2 | 12/2014 | Burnham et al. | |
| 8,992,654 B2 | 3/2015 | Dahms et al. | |
| 9,233,882 B2 | 1/2016 | Burnham | |
| 9,328,030 B2 | 5/2016 | Burnham et al. | |
| 9,586,869 B1 | 3/2017 | Burnham et al. | |
| 9,695,092 B2 | 7/2017 | Burnham et al. | |
| 9,856,178 B2 | 1/2018 | Burnham et al. | |
| 10,487,016 B2 * | 11/2019 | McLaughlin | C05D 1/02 |
| 2002/0098982 A1 | 7/2002 | Burnham | |
| 2002/0157439 A1 | 10/2002 | Gilbert | |
| 2003/0070460 A1 | 4/2003 | Logan et al. | |
| 2003/0089151 A1 | 5/2003 | Logan et al. | |
| 2003/0121302 A1 | 7/2003 | Oliver et al. | |
| 2003/0136165 A1 | 7/2003 | Logan et al. | |
| 2004/0031303 A1 * | 2/2004 | Whitehurst | C05C 9/00 71/28 |
| 2004/0065127 A1 | 4/2004 | Connell | |
| 2004/0120867 A1 | 6/2004 | Dahms et al. | |
| 2004/0177664 A1 | 9/2004 | Hale | |
| 2005/0005660 A1 | 1/2005 | Burnham et al. | |
| 2005/0019207 A1 | 1/2005 | Oliver et al. | |
| 2005/0022569 A1 | 2/2005 | Varshovi | |
| 2005/0039508 A1 | 2/2005 | Burnham et al. | |
| 2005/0077245 A1 | 4/2005 | Blais et al. | |
| 2005/0138978 A1 | 6/2005 | Porubcan | |
| 2006/0243009 A1 | 11/2006 | Burnham | |
| 2006/0254331 A1 | 11/2006 | Burnham | |
| 2007/0062233 A1 | 3/2007 | Burnham | |
| 2007/0257715 A1 | 11/2007 | Semerdzhiev et al. | |
| 2008/0000279 A1 | 1/2008 | Faulmann et al. | |
| 2008/0034822 A1 | 2/2008 | Burnham et al. | |
| 2008/0230484 A1 | 9/2008 | Burnham et al. | |
| 2010/0139345 A1 | 6/2010 | Burnham | |
| 2010/0139346 A1 | 6/2010 | Burnham | |
| 2010/0288003 A1 | 11/2010 | Burnham et al. | |
| 2012/0247164 A1 | 10/2012 | Dahms et al. | |
| 2014/0323297 A1 | 10/2014 | Harman et al. | |
| 2015/0135785 A1 | 5/2015 | Wang et al. | |
| 2015/0191399 A1 | 7/2015 | Dahms | |
| 2015/0210604 A1 * | 7/2015 | Ledoux | C05C 9/005 71/30 |
| 2016/0137560 A1 | 5/2016 | Burnham | |
| 2016/0152523 A1 * | 6/2016 | Khaleel | C05B 13/00 71/21 |
| 2016/0229763 A1 * | 8/2016 | Wheeler | C05C 11/00 |
| 2017/0066692 A1 * | 3/2017 | Ledoux | B01J 2/30 |
| 2017/0066693 A1 * | 3/2017 | Ledoux | C05C 9/005 |
| 2018/0179117 A1 * | 6/2018 | Socolovsky | C05D 9/00 |
| 2019/0194084 A1 * | 6/2019 | Khaleel | C05C 11/00 |
| 2020/0199034 A1 * | 6/2020 | Sharma | C05B 1/02 |

FOREIGN PATENT DOCUMENTS

| | | |
|---|---|---|
| DE | 4127459 | 2/1993 |
| EP | 0143392 | 6/1985 |
| EP | 0356781 | 3/1990 |
| EP | 0557078 | 8/1993 |
| EP | 0770586 | 5/1997 |
| FR | 2133115 | 11/1972 |
| FR | 2757504 | 6/1998 |
| JP | 58032638 | 2/1983 |
| JP | 9110570 | 4/1997 |
| JP | 2001129597 | 5/2001 |
| JP | 2002248454 | 9/2002 |
| WO | WO8102888 | 10/1981 |
| WO | WO9856735 | 12/1998 |
| WO | WO9947282 | 9/1999 |
| WO | WO0136082 | 5/2001 |
| WO | WO0136887 | 5/2001 |
| WO | WO0168562 | 9/2001 |
| WO | WO0169150 | 9/2001 |
| WO | WO03045852 | 6/2003 |
| WO | WO2004094320 | 11/2004 |
| WO | WO2008101250 | 8/2008 |

OTHER PUBLICATIONS

U.S. Appl. No. 08/520,959, Burnham; Jeffrey C.
U.S. Appl. No. 08/532,273, Burnham; Jeffrey C.
U.S. Appl. No. 60/659,957, Burnham.
U.S. Appl. No. 60/659,434, Burnham.
U.S. Appl. No. 60/700,730, Burnham.
U.S. Appl. No. 60/704,458, Burnham.
PCT Search Report and Written Opinion for PCT/US19/46882, dated Oct. 16, 2019.

* cited by examiner

REACTIVE INORGANIC COATINGS FOR AGRICULTURAL FERTILIZERS

REFERENCE TO RELATED APPLICATION

This application claims priority to U.S. Provisional Application No. 62/718,993 filed Aug. 16, 2018, the entirety of which is incorporated by reference.

BACKGROUND

Field of the Invention

This invention is directed to methods, systems, and processes for the coating of granular fertilizers and to the coated granules. In particular, the invention is directed to the coating of fertilizers containing organic components.

Description of the Background

Granular fertilizers have traditionally employed surface coatings to control dusting and to some degree odors during storage, handling and application. Most commonly, various hydrocarbon oils, such as tall oils and or various oils mixed with waxes, such as paraffins, have been employed as coatings for granular fertilizers such as diammonium phosphate, monoammonium phosphate and ammonium sulfate. These oil coatings are sprayed onto the surface of the granule and cover all or part of the exposed surface. They do not react with surface components by modifying the specific surface chemistry of the granule. They are very good for short-term dust prevention and are widely utilized. However, they also serve as an effective surface for the deposition of moisture condensation which then solubilizes and transfers plant nutrient salts from the granule through the oil coating forming crystals on the coating surface. These crystals are loosely organized and constitute a major portion of subsequent dust from said granules. Oil coatings slowly over time may absorb into the structure of the granule leaving the surface less protected against dusting. Other granular coatings may be used, such as urea formaldehyde polymers, urethanes, sulfur and various organic compounds, some for the specific purpose of introducing a slow-release characteristic to the inorganic nutrients, e.g., nitrogen, into the fertilizer. Most of these coatings do an excellent job of preventing dust in the short term but some of these, especially the lighter weight oil coatings, do not protect well in the long term (greater than 1 month from the time of manufacture) and especially when they are exposed to daily changes in temperature and relative humidity. Also, exposure of the fertilizer granules to the higher temperatures and humidities of the summer months especially in the South typically generate a higher rate of degradation.

The problem with dusting over long term storage is exacerbated when the granules contain organic materials, again especially when there are cyclic changes in humidity and temperature. Surface crystal formation and coating oil absorption into the granular structure appears to occur faster when organics are a component of the fertilizer mass such as described in U.S. Pat. Nos. 7,947,104; 8,992,654; and 9,856,178. Granules that are initially dust protected gradually lose that protection over long term warehouse storage. This protection is especially at risk when the environment of the warehouse experiences cycles in both temperature and humidity. Additionally, granular fertilizers can suffer from moisture uptake into the structure of the granule from storage in humid warehouse conditions. When this happens the granular fertilizers often become softened with reduced hardness. This can spoil perfectly good fertilizers to the point where they are no longer commercially useful as handling and controlled application to the field becomes impossible. A further consequence of moisture absorption is the facilitation of crystal formation on the surface as well as adsorption of the coating into the granule. This process compounds the potential for poor dust protection, especially on cyclic moisture deposition on granular surfaces which occur during fertilizer storage. Ideal fertilizer coatings will help protect the granule structure from damage via this moisture absorption and or deposition.

Fertilizers that contain organics may be subject to autogenous oxidation causing granule heating in a warehouse environment due to oxidation of the organic components. The inorganic reactive coatings as per this invention will reduce this potential through the elimination of organic coatings and the introduction of a barrier coating which inhibits the transfer of oxygen into the granule. Further the granule coatings that form sulfates or phosphates are increasing the fire resistance or self-heating resistance of the fertilizers by the release of water from bound water in the crystal structure of the coating. This can assist in cooling the granules and extinguishing the oxidation reaction, since the dehydration of the barrier coating is an endothermic reaction.

Some fertilizer coatings can contain micronutrients, such as boron, calcium, copper, magnesium, manganese, molybdenum, sulfur or zinc that can benefit the performance of the fertilizer. Generally, inclusion of such nutrients increases the cost of the coating for the fertilizer manufacturer. Moreover, a properly manufactured organic-containing fertilizer will have an advantage in that much of its nutrient content, especially nitrogen, will be of the slow-release type. Slow-release fertilizers have been available for many years, but only a few are used with agronomic crops. Most are used in horticultural or turf applications where fertilizer cost is less of an issue. Enhanced efficiency fertilizers (EEF) is a newer term for new formulations that control fertilizer release or alter reactions that lead to nutrient losses. The mechanisms or products include fertilizer additives, physical barriers or different chemical formulations. Fertilizer additives claim to improve fertilizer availability by reducing nitrogen losses from volatilization, denitrification, leaching and immobilization. They may temporarily block bacterial or enzymatic processes in the conversion of urea to ammonium or ammonium to nitrate. Most of the product development has been for nitrogen ("N") compounds, although some are for phosphorus ("P"). The phosphorus products can either be polymer coatings or polymers that shield the P from reactions that create less soluble phosphates.

A slow-release fertilizer is one in which the nutrient, e.g., nitrogen as in ammonium ions, phosphorus as phosphate and/or sulfur ("S") as sulfate, becomes available in the soil column at rates slower than fast-available nutrients as from traditional fertilizers such as urea, ammonium sulfate and di-ammonium phosphate. Slow-release fertilizers are generally considered a form or type of Enhanced Efficiency Fertilizers, although the two are also equated. This slower action and/or prolonged availability of the nutrient in the soil column is very desirable and provides nutrients to the plant throughout the plant growing cycle with the implication that less nitrogen needs to be applied to the soil or crop thereby reducing the potential of environmental contamination and reducing the cost of fertilizer usage. Further, slow-release fertilizers are much greener than traditional inorganic fertilizers. For example, slow-release fertilizers not only provide nutrients to plants over much of their productive crop cycle, they also retain more of the contained nutrients in the soil column thereby avoiding loss of the nutrients via leaching into the ground water. The more advantageous slow-release fertilizers further, do not volatize their contained nutrients, especially nitrogen, into the environment upon application to the soil environment. Traditional inorganic manufactured slow-release nitrogen fertilizers have a price much higher that of ordinary mineral nitrogen fertilizers.

Because the dusting protection afforded by many of the common fertilizer coatings diminish over time a need exists for a fertilizer coating or coatings to react with a granular fertilizer surface such that the reacted components are better bound or permanently located on the granular periphery.

Thus, a need exists for an effective, efficient, and economical coating for treating granular fertilizers. There also exists a need for a variety of coatings that can be specifically tailored for a particular fertilizer chemistry, such as sulfate- or phosphate-based granules, and especially when these two basic nutrients contain or are bound with organics, and that has an enhancement effect on the slow-release/enhanced efficiency of some of the nutrients contained within the fertilizer granule.

SUMMARY OF THE INVENTION

The present invention overcomes the problems and disadvantages associated with current granule coating strategies and designs, and provides new tools and methods for the effective micro-surface coating of granular fertilizers.

One embodiment of the invention is directed to methods of coating fertilizer granules comprising: granulating fertilizer forming fertilizer granules, preferably containing an acid such, by way of example, residual acid from the manufacturing process; contacting the fertilizer granules at an acidic pH with an inorganic compound that chemically reacts with a compound on surfaces of the fertilizer granules forming a coating; and drying the coated fertilizer granules forming dried granules. Preferred acids include sulfuric acid, phosphoric acid, nitric acid, and/or hydrochloric acid. Also preferred inorganic compounds contain aluminum (Al), calcium (Ca), copper (Cu), iron (Fe), manganese (Mn), molybdenum (Mo), sulfur (S), zinc (Zn), and/or an alkaline Earth metal, which includes at least magnesium (Mg), calcium (Ca), strontium (Sr), and barium (Ba), which naturally occurs as baryte or barite and as a hydroxide as baryta and as a carbonate barium carbonate. Preferred inorganic compounds that contain sulfur include, for example, thiosulfate. Examples of thiosulfates include ammonium thiosulfate, potassium thiosulfate, and sodium thiosulfate.

Preferably the fertilizer granules contain an anionic component and the inorganic compound contains a cationic component. Preferred cationic components include, for example, calcium ions, magnesium ions, aluminum ions, polyaluminum ions, strontium ions, and/or barium ions. Preferred anionic components include, for example, chloride ions ($Cl^-$), nitrate ions ($NO_3^-$), ammonium nitrate ions ($NH_4NO_3^-$), hydroxide ions ($OH^-$), and/or acetate ions ($CH_3COO^-$) as an anionic component.

Preferably the acidic pH of the chemical reaction is at a pH of 6.8 or less, 6.0 or less, 5.5 or less or even lower. Preferably the inorganic compound contains calcium ions as a cationic component and chloride ions as the anionic component. Contacting may also include a surfactant. Preferred surfactants include, but are not limited to dodecylbenzyl sulfonic acid (DBSA), an ethoxylated alcohol of C10-C16, sodium lauryl ether sulfate, amine oxide, methyl salicylate, coco betaine, an anionic, cationic, or nonionic surfactants, and mixtures thereof.

Preferably the inorganic Earth metal compound contains calcium chloride and forms calcium sulfate on surfaces of the fertilizer granules. The calcium sulfate may comprise an anhydrite, a dihydrate, and/or a hemihydrate crystal structure. Preferably fertilizer granules that are phosphate-based are contacted with an inorganic compound that contains aluminum ions, calcium ions, polyaluminum ions, iron ions and/or combinations thereof as the cationic component, and/or chloride ions ($Cl^-$), nitrate ions ($NO_3^-$), ammonium nitrate ions ($NH_4NO_3^-$), hydroxide ions ($OH^-$), and/or acetate ions ($CH_3COO^-$) as an anionic component. Preferably contacting forms an aluminum, aluminum-iron complex, sulfur, and/or aluminum-calcium complex on surfaces of the fertilizer granules. Preferably contacting comprises spraying an aqueous solution of the inorganic alkaline metal compound on surfaces of the fertilizer granules. Preferably the coatings comprise from about 4 to 40 pounds per ton of dried granules, or more preferably from about 10 to 20 pounds per ton of dried granules. Preferably the dried granules comprise about 92% to 100% solids, more preferably about 96% to 99% solids, and more preferably about 98% to 99% solids.

Another embodiment of the invention is directed to methods of coating fertilizer granules comprising: granulating fertilizer comprising organic components comprising fertilizer granules; contacting the fertilizer granules in an acidic environment with an inorganic compound that chemically reacts with a compound on surfaces of the fertilizer granules forming a coating, wherein: the inorganic compound comprises Ca, Cu, Mg, Mo, Mn, Fe, Al, and/or Zn as a cationic component; the inorganic compound comprises chloride ions ($Cl^-$), nitrate ions ($NO_3^-$), ammonium nitrate ions ($NH_4NO_3^-$), hydroxide ions ($OH^-$), and/or acetate ions ($CH_3COO^-$) as an anionic component; and the coating comprises $(Al)Cl_3$, (Al)chlorohydrate, polyaluminum chloride, $(Ca)NH_4NO_3$, $(Ca)Cl_2$, $(Fe)Cl_3$, $(Fe)_3(SO_4)_2$, sulfur (S), $(Mg)SO_4$, $(Mg)Cl_2$, $(Mn)Cl_2$, $(Mn)NH_4PO_4$, $(Ca)_3(PO_4)_2$, monocal $(Ca)(H_2PO_4)_2 \cdot H_2O$, and/or dical $(Ca_2)(H_2PO_4)_4$; and drying the coated fertilizer granules forming dried granules. Fertilizer granules also may have additional coatings of the same or a different coating material, and thereby be multiply coated.

In a further embodiment of the invention, micronutrients, such as boron, calcium, copper, magnesium, manganese, molybdenum, sulfur or zinc or combinations of these, can be added to the coatings such that the micronutrients become part of the final mass of the resultant fertilizer and that these micronutrients can benefit the performance of the fertilizer.

Another embodiment of the invention is directed to coated fertilizers. Preferably, fertilizers may contain organic or non-organic materials, and also preferably the coated fertilizers may be made by, but not limited to, those made in accordance with the methods disclosed herein. Preferred coatings include one or more of the coatings as described in this disclosure.

Other embodiments and advantages of the invention are set forth in part in the description, which follows, and in part, may be obvious from this description, or may be learned from the practice of the invention.

DESCRIPTION OF THE INVENTION

Figure 1:
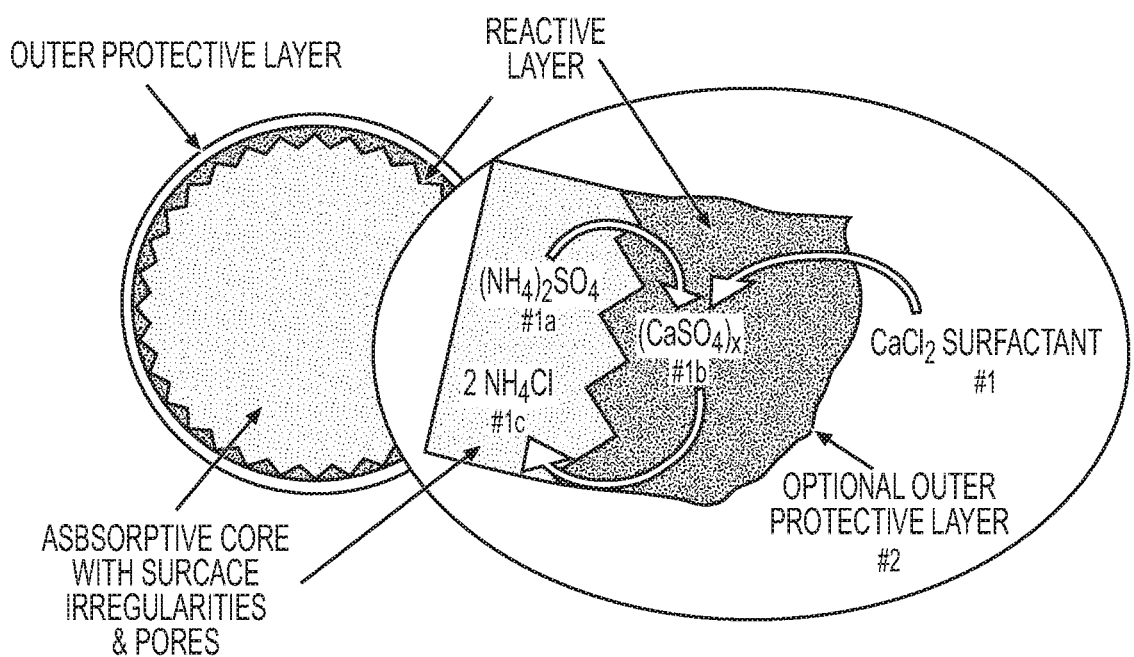
FIG. 1 Schematic of the reactive coating process employing calcium chloride (with surfactant) applied to the surface of an organically-enhanced ammonium sulfate containing granule as a first layer. The diagram also shows that granules may be coated with an optional outer protective coating.

Conventional fertilizers granules utilize surface coatings to control dusting and to some degree odors during storage, handling, and application. Coatings commonly used include hydrocarbon oils, such as tall oils and or oils mixed with waxes, such as paraffins. These conventional oil coatings are sprayed onto the surface of granules and cover all or part of the exposed surface. Although these coating demonstrate good dust prevention, and are widely used, they are only for short-term dust prevention.

It has been surprisingly discovered that surface coatings can be generated that provide protection of the fertilizer material and long-term dust control, without comprising fertilizer usefulness and applicability. In fact, it was surprisingly discovered that coatings can be provided that add important nutrients thereby expanding the usefulness and applicability of the fertilizer. According to invention, fertilizers granules to be coated are manufactured or otherwise exposed to an inorganic compound containing aluminum, sulfur, iron, phosphorous or another chemical moiety on their outer surfaces. Preferably the inorganic compound contains the cationic component and fertilizer contains the anionic component. The granules are contacted with an inorganic compound at an acidic pH that reacts with the chemical moiety on surfaces forming a coating. Preferably the acidic pH is 6.8 or less. The coating acts as a shell protecting the fertilizer granules from exposure to humidity by reducing water absorption, provides increased hardness, and also serves as a fertilizer component. Coated granules are also resistant to self-heating and a have reduced odor, as compared to fertilizer granules that have not been coated. Coated granules may be manufactured with a slow-release or enhanced-release nutrient profile as desired. The slow-release nutrient profile comprises a reduced rate, reduced amount, and/or differential release of one or more nutrients from the dried granules. The enhanced-release profile comprises the expedited release of one or more nutrients.

Such coatings can be used on any form and/or type of fertilizer. Preferably, the coatings of the invention are utilized on fertilizer granules, which may be of any structure (e.g., round, oval, square, pellets, or of no particular or mixed structure), of any size (e.g., with diameters or cubic volumes from mm to cm's as desired), and of any type (e.g., biosolids, organics, chemicals), and are collectively referred to herein interchangeably as granules or pellets. Preferably, fertilizer granules to be coated may have a sulfur or phosphorous content, or sulfur or phosphorous may be added during manufacture or as a separate initial coating. Preferably, fertilizer materials to be coated are granules of organic-containing fertilizers such as, for example, those disclosed and described in U.S. Pat. Nos. 7,513,927; 7,662,205; 7,662,206; 7,947,104; 8,105,413; 8,557,013; 8,992,654; and 9,856,178 (which are specifically and entirely incorporated by reference). Granules to be coated are reacted with an inorganic compound such as, for example, compounds containing aluminum (Al), calcium (Ca), copper (Cu), iron (Fe), manganese (Mn), molybdenum (Mo), sulfur (S), zinc (Zn), and/or an alkaline Earth metal, which includes at least magnesium (Mg), calcium (Ca), strontium (Sr), and barium (Ba), which naturally occurs as baryte or barite and as a hydroxide as baryta and as a carbonate barium carbonate. Preferred inorganic compounds that contain sulfur include, for example, thiosulfate. Examples of thiosulfates include ammonium thiosulfate, potassium thiosulfate, and sodium thiosulfate. The inorganic compound may contain an alkaline Earth metal such as those in Group IIA of the Periodic Table (the Beryllium Group). Preferably the alkaline Earth metal compound comprises magnesium, calcium, barium, beryllium, and/or strontium and serves as a cationic component in the reaction. Preferred cationic components also include, for example, calcium ions, magnesium ions, aluminum ions, polyaluminum ions, strontium ions, and/or barium ions.

Preferably the anionic component comprises one or more of chloride ions ($Cl^-$), nitrate ions ($NO_3^-$), ammonium nitrate ions ($NH_4NO_3^-$), hydroxide ions ($OH^-$), and/or acetate ions ($CH_3COO^-$), which is contributed by the fertilizer granules.

Preferably the inorganic compound is combined with the fertilizer granules at an acidic pH. Preferred pH values of the chemical reaction include a pH of about 6.8 or less, about 6.0 or less, about 5.5 or less, about 5.0 or less, about 4.5 or less, about 4.0 or less, or even lower. pH values can be easily maintained from about 6.8 to about 4.0, from about 6.5 to about 4.0, from about 6.0 to about 4.0, from about 5.5 to about 4.0, from about 5.0 to about 4.0 and from about 4.5 to about 0. Generally, the lower the pH, the faster the reaction but fertilizers are limited by the need to be physiologically compatible with soil ecology and plant requirements Contacting may be by spraying, soaking, misting, sparging, or otherwise exposing fertilizer granules to the inorganic component. Preferably the inorganic component is present in an aqueous form. Contacting may also include a surfactant. Preferred surfactants include, but are not limited to dodecylbenzyl sulfonic acid (DBSA), an ethoxylated alcohol of C10-C16, sodium lauryl ether sulfate, amine oxide, methyl salicylate, coco betaine, an anionic, cationic, or nonionic surfactants, and mixtures thereof.

Contacting is typically performed by spraying and upon exit of granules from a cooling apparatus which typically reduce manufacturing temperatures to between 100° F. (37.8° C.). and 170° F. (76.7° C.). According, the temperature of contacting is in that range as found in manufacturing processes, such as, for example, from about 100° F. (37.8° C.) to about 200° F. (93° C.), although temperatures are typically from about 120° F. (48.9° C.) to about 170° F. (76.7° C.). Warmer or cooler are not harmful to the process, with warmer temperatures serving to increase the speed of the coating reaction.

Calcium and in the form of calcium chloride is generally preferred as inexpensive and easily dissolvable in aqueous solutions such as water. The calcium ions of the aqueous solution will react with the ammonium sulfate present in and on the granule surface forming a salt, such as calcium sulfate as anhydrite, hemihydrate, or preferably a dihydrate as gypsum. The granule so treated then equilabrates with a surface layer of gypsum which is protective to the granule as well as providing nitrogen and sulfur nutrients for the fertilizer. The aqueous solution of calcium chloride to be reacted with granules is preferably at a concentration from about 10% to about 75%, and more preferably at a concentration of about 35% to about 50%. The temperature of the calcium chloride fluid itself can be ambient, e.g., commonly 60° F. (15° C.) to 90° F. (32° C.) or can be heated to a range of about 90° F. (32° C.) to about 160° F. (71° C.). If temperatures are above 90° F. (32° C.) then the concentration of the calcium chloride can be increased to above 40% up to 75%. The environmental temperature of application can range from about 120° F. (49° C.) to about 170° F. (76° C.), but more preferably is in the range of about 130° F. (54° C.) to about 160° F. (71° C.). Such application temperatures facilitate the reaction to calcium sulfate dihydrate on the granule surface with the subsequent loss of the carrier moisture of the calcium chloride such that the granule returns to its intended dryness of greater than about 97% solids and more preferably greater than about 98% solids. Application mass quantities of reactive coatings range from about 4 to about 40 pounds per ton with preferred application range of about 10 to about 20 pounds per ton. Such application results in a reacted surface in the range of about 1 μm up to about 50 μm dependent upon the initial concentration of the calcium chloride.

Coatings that can be applied to phosphate-based fertilizers include, for example, diammonium phosphate (DAP) or monoammonium phosphate (MAP). The cationic anion preferably comprises $Al^{+3}$ and/or $Fe^{+2}$, which may be included as a salt, to form aluminum and or iron phosphate salts forming protective coatings on the surface of granules. The cationic component may comprise Ca, Mg, Mn, Fe, Al, and/or Zn or mixtures thereof. These cations may be applied as: $(Al)Cl_3$; (Al)chlorohydrate; polyaluminum chloride; $(Ca)NH_4NO_3$; $(Ca)Cl_2$; $(Ca)OH_2$; $FeSO_4\text{-}7H_2O$; $(Fe)_3(SO_4)_2$; $(Mg)SO_4$; $(Mg)Cl_2$; $(Mg)OH_2$; $(Mn)Cl_2$; $(Mn)NH_4PO_4$; $(Ca)_3(PO_4)_2$; monocal $(Ca)(H_2PO_4)_2 \cdot H_2O$; and dical $(Ca_2)(H_2PO_4)_4$ or mixtures thereof.

In a preferred embodiment, the alkaline earth compound may include a surfactant, such as, for example, dodecyl benzyl sulfonic acid (DBSA). The surfactant acts as a dispersant in solution. When this surfactant-calcium chloride mix is sprayed on the heated granules the surfactant causes a better distribution of the calcium on the irregular surface of the fertilizer granules resulting in a superior calcium sulfate coating. Preferably, the mix also reacts into the surface of the granule. The depth of interaction may be from about 1 to about 200 μm, preferably from about 2 to about 50 μm, and more preferably from about 4 to about 20 μm. Other surfactants that can be utilized include, for example, DBSA, WOOLITE® (cleaning preparations), ethoxylated alcohols of C10-C16, sodium lauryl ether sulfate, amine oxide, coco betaine, an anionic, cationic, or nonionic surfactants, and/or mixtures thereof. The surfactants may be utilized at or above the critical micelle concentration for each dispersant. Surfactants can also impart a desirable hydrophobicity to the surface which may be one of the mechanisms causing less surface crystal formation and absorption of the surface coating into the granule with granule storage age.

An additional embodiment utilizes aqueous thiosulfate as the spray coating—preferably as an ammonium thiosulfate, however other cationic elements such as sodium and potassium work as well. The thiosulfate is an anion obtained from a potassium thiosulfate or a sodium thiosulfate or an ammonium thiosulfate or other compounds containing thiosulfate. The thiosulfate reacts with the ammonium ion on the surface of the ammonium sulfate or ammonium phosphate-based granules and is converted to elemental sulfur which then deposits on the granule surface. This sulfur provides a protective surface layer on the granule and can restrict the release of nitrogen (ammonium ion) from the interior granule. Further, this elemental sulfur is in itself a mechanism of providing a slow-release sulfur from the granular fertilizer to targeted crops. Optimally, the anion concentration range should be between about 20% and about 40% with a preferred concentration range of about 25% to about 35%.

The coating process may occur in a coating or cooling vessel specifically for that purpose typically a rotary drum or a mixer. Alternatively, cooling and coating may be accomplished in a single vessel which cools the material and mixes the coating agent with the granules. Coating is with a de-duster or glazing reactive chemical compound which minimizes dust generation during transport, storage, especially long term storage—and application. The finished coated granule or pellet is then conveyed to storage as finished high nitrogen containing biobased-enhanced inorganic ammonium fertilizer until shipment from the manufacturing site. Properly coated and dried pellets or granules have a hardness range of greater than about 4 to about 12 pounds, preferably from about 5 to about 8 pounds, crush resistance to resist dusting and handing during transport, shipment and fertilizer application. Coatings also increase resistance to surface crystal formation thereby decreasing the dusting potential.

Another embodiment of the invention is directed to coated fertilizers. Preferred fertilizers include organic and inorganic fertilizers, which may be granulated, pelletized or of another form or structure. Coatings include any of the coatings as described in this disclosure and preferred coated fertilizers may be made, but are not limited to, those made in accordance with the methods disclosed herein.

The following examples illustrate embodiments of the invention, but should not be viewed as limiting the scope of the invention.

EXAMPLES

Example 1

To exemplify this disclosure, wet community waste organics comprised of digested food waste and manures (also referred to generally as biosolids or organic materials) are received at a fertilizer manufacturing facility with a percent solids of about 17.0 percent. The plant is set up to operate at an organics processing rate of 220 wet tons per day. In this example, the material is mixed with previously dried organic materials to yield a preferred percent solids of about 20% to 26%, or more preferably about 22% to 24% solids. This conditioned organics mix is pumped into the first vessel for hydrolysis. At the orifice of the first vessel, the conditioned organic mix is further mixed with 93% sulfuric acid in an amount pre-calculated to yield a degree of heat of hydration of about 110° C. (230° F.) and a total of about 17% sulfur in the finished fertilizer. The contents of the vessel are mixed vigorously at a rate of 360 RPM for between about 30 seconds and ten minutes or, preferably for between about two minutes and six minutes. Within the vessel, the acidified mix gradually is forced to the upper quarter of the vessel where it is discharged after the reaction. In this first vessel, proteins from the organics are hydrolyzed to various length of polypeptides or, preferably, to monomeric amino acids. Other macro-organic compounds that are present are also hydrolyzed to smaller molecular forms. Hydrolysis increases the fluidity of the contents of the vessel, preferably to less than 1000 cP. This now fluidized, acidified mix is then transferred under pressure to the bottom orifice of a second pressure vessel for ammoniation, wherein it is mixed with vaporized anhydrous ammonia sufficient to raise the temperature of the mix to over 150° F. (65° C.) (or alternatively over 300° F. (149° C.)). The internal pressure of the second vessel can equal or exceed 35 psi and is sufficient to cause the concentration of nitrogen (N) in the final formulation of the resultant fertilizer to between about 16% to 17% nitrogen by dry weight of the finished product. The ammoniated mix is maintained in the second pressure vessel for six minutes of reaction time before it is discharged through an orifice to the granulator. The discharged mix (also referred to as a melt) is slightly increased in viscosity compared to the discharge of the first pressure vessel, but preferably has a viscosity of less than about 2000 cP. This discharged melt is under pressure and therefore enters the granulator to be sprayed onto a receiving bed of recycled fertilizer granules (e.g., crushed fertilizer material or undersized fertilizer material or fertilizer dust material collected from the various dust collectors contained in the process air treatment system). The spray coats the receiving fertilizer granules and gradually builds up a series of coatings or agglomerated material, such that the granular fertilizer is produced in which the majority of the material is of the desired product size. Desired sizes may be, for example, about 07 mm to 3.5 mm (70 sgn to 350 sgn; "size guide number") diameter granules, suitable for use in commercial agriculture. Subsequent or simultaneously with application of the sprayed coating, an amount of a hardener is applied to the granules in the granulator. Preferably, the hardener amount is sufficient for the hardness of the finished granules to reach a range of about 5 lbs. to 8 lbs. crush strength. This material is then dried to about 98% or more solids, for example in a rotary drum dryer, and then screened to one of three commercial sizes of about 0.7 mm to 1.9 mm, about 1.2 mm to 1.4 mm, and to about 2.6 mm to 3.5 mm. Smaller material is returned to the granulator as part of the recycle bed. All larger material is crushed in a chain mill and also returned to the granulator as part of the recycle bed. A portion of the proper (standard for most agricultural crops) sized product, preferably about 2.4 mm to 3.0 mm for commercial product size, may also be returned to the recycle bed to maintain the mass balance of the production process. The steps of this process were performed under negative pressure to minimize dust and to prevent odors being released into the manufacturing environment. Process air was treated through a robust odor control system such that no noxious odors were perceived at the fence line of the manufacturing property. Scrubbed nutrients such as ammonium ion, in this example—ammonium sulfate, were returned to a process water tank wherein it was added to the first mixer to help control the solids content and the fluidity of the conditioned mix entering the first pressure vessel. This maximizes the efficiency of the manufacturing process so that the only discharges from the fertilizer manufacturing process are treated condensed water (from the municipal organic material and any cooling water that may need to be discharged from the cooling system) along with the treated process air. In the fertilizer manufactured in this example the slow release percentage of nitrogen was about 30% of the total nitrogen in the product. This slow release nitrogen is in the form of an organic matrix in which the positive charged ammonium ion is electrostatically bound to a negative charge on the organic compounds such as polypeptides and amino acids that comprise the core of the matrix. After exiting the rotary dryer, the product is passed through a product cooler to reduce the temperature of the product to between about 115° F. (46° C.) and 160° F. (71° C.), and more preferably between about 130° F. (54° C.) and 150° F. (65° C.). According, the temperature of the coating process is in that range as found in manufacturing processes, such as, for example, from about 100° F. (37.8° C.) to about 200° F. (93° C.), although temperatures are typically from about 120° F. (48.9° C.) to about 170° F. (76.7° C.). with a spray of the reactive calcium chloride in the range of about 30% to 50% concentration in an aqueous solution mixed with dodecylbenzenesulfonic acid (DBSA) as a surfactant, in the range of about 0.1% to 0.4%. The granules retain acid from the manufacture process are generally about pH 6.8 or less. The coating on the granules is about 6 #to 40 #per ton, but more preferably a coating application is about 10 #to 20 #per ton. The temperature of the sprayed granule is sufficient to cause the water from the sprayed coating to evaporate with the dryness of the granule returning to about 98% or greater. The result is a smooth coated granular fertilizer with enhanced protection against dusting in warehouse storage.

A schematic of the reactive coating process employing calcium chloride (in this case with surfactant) applied to the surface of an organically-enhanced ammonium sulfate containing granule as a first layer is shown in FIG. 1. The diagram also shows that granules may be coated with an optional outer protective coating. This outer coating may comprise an oil based or another traditional coating, or a second reactive coating layer.

Figure 2:
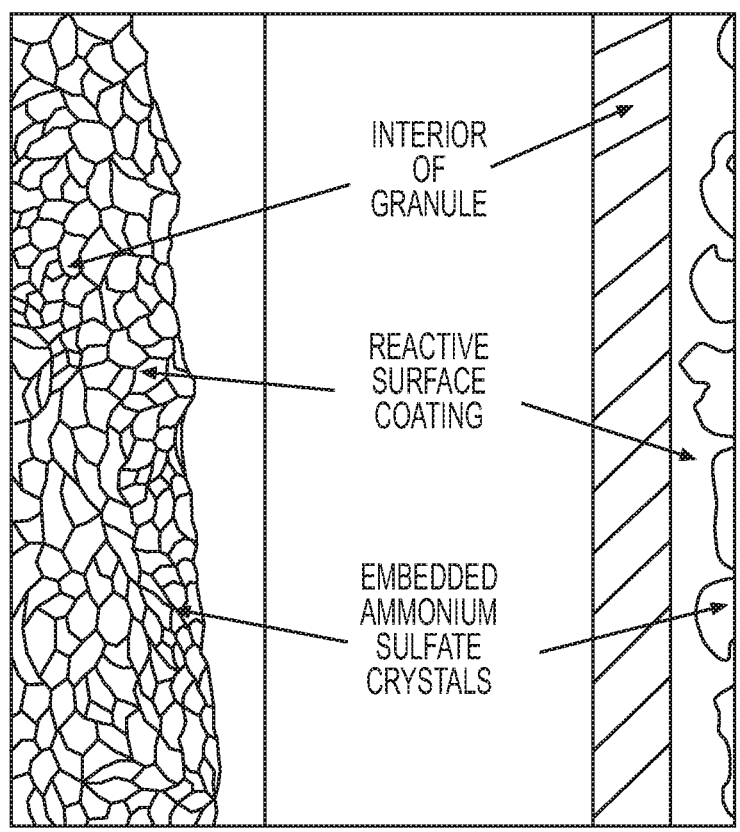
FIG. 2 Light micrograph and schematic diagram of cross section of a coated organically-enhanced ammonium sulfate containing granule showing surface coating with embedded ammonium sulfate crystals.

FIG. 2 is a schematic showing a light micrograph and diagram of a cross section of a coated organically-enhanced ammonium sulfate containing granule showing surface coating with embedded ammonium sulfate crystals.

Figure 3:
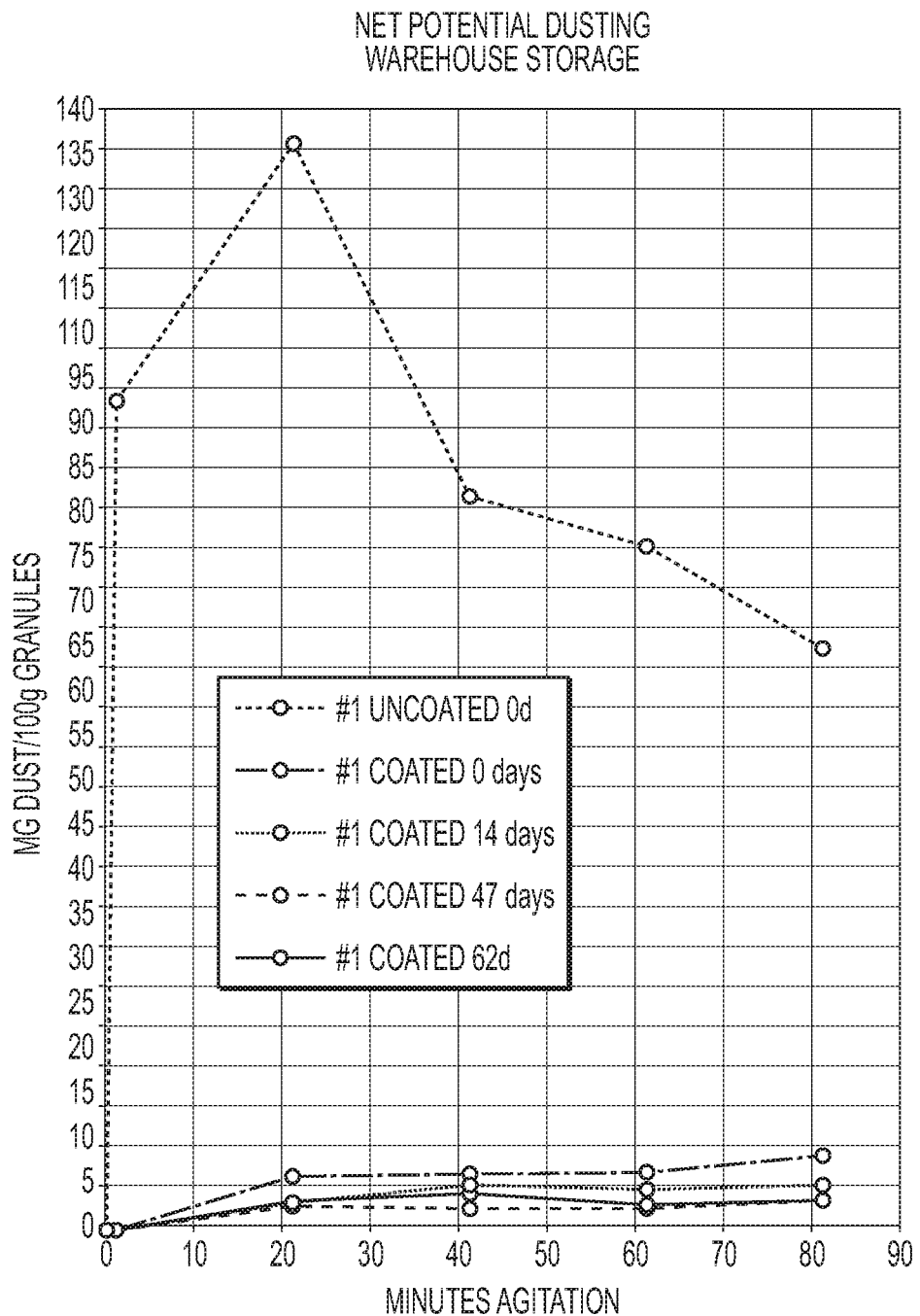
FIG. 3 Graph showing reactive coating on sulfate-based granular fertilizer made according to the process of Example 1 showing enhanced dusting protection over time as compared to uncoated granules.

FIG. 3 is a graph showing that the reactive coating on sulfate-based granular fertilizer made according to the process of this example has enhanced dusting protection over time as compared to uncoated granules.

The product of this example contained a 98% dry granular fertilizer with a nutrient formulation of 17-1-0-20-1-16 (N-P-K-S-Fe-Organic) by dry weight of the finished granules.

Example 2

The conversion of thiosulfate to elemental sulfur is another example of a reactive coating that enhances slow release of sulfur and nitrogen by migration inhibition. It further serves as a base coat that reduces surface area for subsequent placement of a final top seal coat for dust and abrasion control.

In this example, organic material was processed in accordance with the process of Example 1 through a rotary drum cooling apparatus. At the rotary drum, a different approach was taken to produce a reactive coating for the dry granules. A preferred anion concentration is between 20% and 40% with a more preferred concentration of 30%. A solution of potassium thiosulfate (50% in water) was sprayed on hot (140° F. to 160° F.; 60° C. to 71° C.) granules such that thiosulfate reacted with free hydrogen ions present on granule surfaces as sulfuric acid (see equation below):

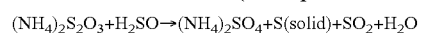

When the acid is phosphoric, the formula is:

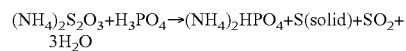

The ammonium sulfate or ammonium phosphate joins with other ammonium molecules that characterize the surface of these fertilizer granules. These reactions result in the deposition of the elemental sulfur on the surface of the granules providing a surface barrier to humidity during warehouse storage of said granules.

Example 3

In this example, organic material was processed in accordance with the process of Example 1 through a rotary drum cooling apparatus. At the rotary drum, a different approach was again taken to produce a reactive coating for the dry granules. At the rotary drum coating apparatus, a solution of iron sulfate (in water at a range of 15% to 40% with DBSA in a range of 0.2% to 3% as a surfactant) was sprayed on hot (140° F. to 160° F.; 60° C. to 71° C.) granules such that the iron replaces one of the ammonium groups of the diammonium phosphate that is present on the surface as sulfuric acid on said granules. This reaction results in the deposition of an iron ammonium phosphate coating.

The use of monohydrate or heptahydrate iron sulfate was used to produce the reactive coating for phosphate based granule. The use of iron sulfate results in the production of a coating of iron (+2)—ferrous ammonium phosphate. This is an insoluble salt found as a water insoluble fraction for both diammonium phosphate (DAP) and monoammonium phosphate (MAP) fertilizers. An equation showing this reaction with diammonium phosphate is shown below:

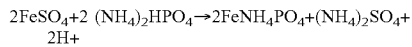

$$2FeSO_4 + 2(NH_4)_2HPO_4 \rightarrow 2FeNH_4PO_4 + (NH_4)_2SO_4 + 2H+$$

This is another example of a reactive coating that enhances slow release of nutrients contained in the core of the coated granules while preventing dust formation from granule attrition.

Other embodiments and uses of the invention will be apparent to those skilled in the art from consideration of the specification and practice of the invention disclosed herein. All references cited herein, including all publications, U.S. and foreign patents and patent applications, are specifically and entirely incorporated by reference. It is intended that the specification and examples be considered exemplary only with the true scope and spirit of the invention indicated by the following claims. Furthermore, the term "comprising of" includes the terms "consisting of" and "consisting essentially of."

The invention claimed is:

1. A method of coating fertilizer granules comprising:
providing fertilizer granules containing organic material and an acid;
contacting the fertilizer granules at an acidic pH with an inorganic compound, wherein the inorganic compound chemically reacts with the acid of the fertilizer granules forming a coating on the fertilizer granules, wherein the coating comprises aluminum, iron, aluminum-calcium sulfate, ferrous ammonium phosphate, sulfur, and/or an aluminum-iron complex; and
drying the coated fertilizer granules forming dried and coated granules.

2. The method of claim 1, wherein the acid comprises sulfuric acid, phosphoric acid, nitric acid, and/or hydrochloric acid.

3. The method of claim 1, wherein the acidic pH is less than about 6.8.

4. The method of claim 1, wherein the acidic pH is less than about 6.0.

5. The method of claim 1, wherein the inorganic compound comprises an alkaline metal, ammonium thiosulfate, potassium thiosulfate, and/or sodium thiosulfate.

6. The method of claim 1, wherein the inorganic compound contains a cationic component and the fertilizer granules contain an anionic component.

7. The method of claim 6, wherein the anionic component comprises chloride ions (Cl$^-$), nitrate ions (NO$_3^-$), ammonium nitrate ions (NH$_4$NO$_3^-$), hydroxide ions (OH)$^-$), and/or acetate ions (CH$_3$COO$^-$).

8. The method of claim 6, wherein the cationic component comprises barium ions, calcium ions, magnesium ions, aluminum ions, polyaluminum ions, iron ions, and/or sulfur ions.

9. The method of claim 6, wherein the cationic component comprises calcium ions and the anionic component comprises chloride ions.

10. The method of claim 1, wherein contacting comprises spraying an aqueous solution of the inorganic compound on surfaces of the fertilizer granules.

11. The method of claim 1, wherein the coating comprises from about 4 to about 40 pounds per ton of dried granules.

12. The method of claim 1, wherein the coating comprises from about 10 to about 20 pounds per ton of dried granules.

13. The method of claim 1, wherein the dried and coated granules comprise about 92% to about 100% solids.

14. The method of claim 1, wherein the dried and coated granules comprise about 96% to about 99% solids.

15. The method of claim 1, wherein the dried and coated granules comprise about 98% to about 99% solids.

16. The method of claim 1, wherein the dried and coated granules have reduced dust formation as compared to fertilizer granules that have not been so processed.

17. The method of claim 1, wherein the dried and coated granules are less absorbent to humidity as compared to fertilizer granules that have not been so processed.

18. The method of claim 1, wherein the dried and coated granules are resistant to self-heating as compared to fertilizer granules that have not been so processed.

19. The method of claim 1, wherein the dried and coated granules have a reduced odor as compared to fertilizer granules that have not been so processed.

20. The method of claim 1, wherein the dried and coated granules have a slow-release nutrient profile.

21. The method of claim 20, wherein the slow-release nutrient profile comprises a reduced rate, reduced amount, and/or differential release of one or more nutrients from the dried and coated granules.

22. The method of claim 1, wherein the dried and coated granules have an enhanced release of one or more nutrients.

23. The method of claim 22, wherein the one or more nutrients comprise nitrogen, phosphorus, potassium, sulfur, iron, organics, or a combination thereof.

24. The method of claim 1, further comprising adding micronutrients to the fertilizer granules.

25. The method of claim 24, wherein the micronutrients comprise boron, calcium, copper, magnesium, manganese, molybdenum, sulfur, zinc and/or combinations thereof.

26. The method of claim 1, wherein the fertilizer granules contain organic materials that are chemically bound to inorganic nutrients by covalent bonds, noncovalent bonds, electrostatic bonds, hydrogen bonds and/or combinations thereof.

27. The method of claim 1, wherein the contacting further comprises a surfactant.

28. The method of claim 27, wherein the surfactant comprises dodecylbenzyl sulfonic acid (DBSA), an ethoxylated alcohol of C10-C16, sodum lauryl ether sulfate, amine oxide, methyl salicylate, coco betaine, an anionic, cationic, or nonionic surfactants, or mixtures thereof.

29. Dried and coated granules made by the method of claim 1.

30. A method of coating fertilizer containing organic material comprising:
   providing fertilizer comprised of organic materials that contain exposed chloride ions (Cl$^-$), nitrate ions (NO$_3^-$), ammonium nitrate ions (NH$_4$NO$_3^-$), hydroxide ions (OH)$^-$), and/or acetate ions (CH$_3$COO$^-$);
   providing an inorganic compound that contains ions selected from the group consisting of Ca, Mg, Mn, Fe, Al, and Zn;
   contacting the fertilizer at an acidic pH with the inorganic compound forming a coating on the fertilizer, wherein the coating comprises aluminum, iron, aluminum-calcium sulfate, ferrous ammonium phosphate, sulfur, and/or an aluminum-iron complex; and
   drying the coated fertilizer.

31. The method of claim 30, wherein the coating comprises (Al)Cl$_3$, (Al)chlorohydrate, polyaluminum chloride, (Ca)NH$_4$NO$_3$, (Ca)Cl$_2$, (Fe)Cl$_3$, FeSO$_4$-7H$_2$O, (Fe)$_3$(SO$_4$)$_2$, (Mg)SO$_4$, (Mg)Cl$_2$, (Mn)Cl$_2$, (Mn)NH$_4$PO$_4$, (Ca)$_3$(PO$_4$)$_2$, monocal (Ca)(H$_2$PO$_4$)$_2$H$_2$O, and/or dical (Ca$_2$)(H$_2$PO$_4$)$_4$, and/or elemental sulfur.

32. The method of claim 30, wherein the acidic pH is less than about 6.8.

33. The method of claim 30, wherein the coated fertilizer, as compared to fertilizer not so processed:
   has reduced dust formation;
   is less absorbent to humidity;
   is resistant to self-heating; and/or
   has a reduced odor.

34. The method of claim 30, wherein the contacting further comprises a surfactant.

35. The method of claim 34, wherein the surfactant comprises dodecylbenzyl sulfonic acid (DBSA), an ethoxylated alcohol of C10-C16, sodium lauryl ether sulfate, amine oxide, coco betaine, an anionic, cationic, or nonionic surfactants, or mixtures thereof.

36. A method of coating fertilizer granules comprising:
   providing fertilizer granules containing organic material and an acid;
   contacting the fertilizer granules at an acidic pH with an inorganic compound and a surfactant, wherein the inorganic compound chemically reacts with the acid of the fertilizer granules forming a coating on the fertilizer granules, wherein the coating comprises aluminum, iron, aluminum-calcium sulfate, calcium sulfate, ferrous ammonium phosphate, sulfur, and/or an aluminum-iron complex; and
   drying the coated fertilizer granules forming dried and coated granules.

37. The method of claim 36, wherein the acid comprises sulfuric acid, phosphoric acid, nitric acid, and/or hydrochloric acid.

38. The method of claim 36, wherein the acidic pH is less than about 6.8.

39. The method of claim 36, wherein the acidic pH is less than about 6.0.

40. The method of claim 36, wherein the inorganic compound contains a cationic component and the fertilizer granules contain an anionic component.

41. The method of claim 40, wherein the anionic component comprises chloride ions (Cl$^-$), nitrate ions (NO$_3^-$), ammonium nitrate ions (NH$_4$NO$_3^-$), hydroxide ions (OH)$^-$), and/or acetate ions (CH$_3$COO$^-$).

42. The method of claim 40, wherein the cationic component comprises calcium ions and the anionic component comprises chloride ions.

43. The method of claim 36, wherein contacting comprises spraying an aqueous solution of the inorganic compound on surfaces of the fertilizer granules.

44. The method of claim 36, wherein the coating comprises from about 4 to about 40 pounds per ton of dried granules.

45. The method of claim 36, wherein the coating comprises from about 10 to about 20 pounds per ton of dried granules.

46. The method of claim 36, wherein the dried and coated granules comprise about 92% to about 100% solids.

47. The method of claim 36, wherein the dried and coated granules comprise about 96% to about 99% solids.

48. The method of claim 36, wherein the dried and coated granules comprise about 98% to about 99% solids.

49. The method of claim 36, wherein the dried and coated granules have reduced dust formation as compared to fertilizer granules that have not been so processed.

50. The method of claim 36, wherein the dried and coated granules are less absorbent to humidity as compared to fertilizer granules that have not been so processed.

51. The method of claim 36, wherein the dried and coated granules are resistant to self-heating as compared to fertilizer granules that have not been so processed.

52. The method of claim 36, wherein the dried and coated granules have a reduced odor as compared to fertilizer granules that have not been so processed.

53. The method of claim 36, wherein the dried and coated granules have a slow-release nutrient profile.

54. The method of claim 53, wherein the slow-release nutrient profile comprises a reduced rate, reduced amount, and/or differential release of one or more nutrients from the dried and coated granules.

55. The method of claim 36, wherein the dried and coated granules have an enhanced release of one or more nutrients.

56. The method of claim 55, wherein the one or more nutrients comprise nitrogen, phosphorus, potassium, sulfur, iron, organics, or a combination thereof.

57. The method of claim 36, further comprising adding micronutrients to the fertilizer granules.

58. The method of claim 57, wherein the micronutrients comprise boron, calcium, copper, magnesium, manganese, molybdenum, sulfur, zinc and/or combinations thereof.

59. The method of claim 36, wherein the fertilizer granules contain organic materials that are chemically bound to inorganic nutrients by covalent bonds, noncovalent bonds, electrostatic bonds, hydrogen bonds and/or combinations thereof.

60. The method of claim 36, wherein the surfactant comprises dodecylbenzyl sulfonic acid (DBSA), an ethoxylated alcohol of C10-C16, sodium lauryl ether sulfate, amine oxide, coco betaine, an anionic, cationic, or nonionic surfactants, or mixtures thereof.

61. A method of coating fertilizer containing organic material comprising:
   providing fertilizer comprised of organic materials that contain exposed chloride ions (Cl$^-$), nitrate ions (NO$_3^-$), ammonium nitrate ions (NH$_4$NO$_3^-$), hydroxide ions (OH)$^-$), and/or acetate ions (CH$_3$COO$^-$);
   providing an inorganic compound that contains ions selected from the group consisting of Ca, Mg, Mn, Fe, Al, and Zn;
   contacting the fertilizer at an acidic pH with the inorganic compound and a surfactant forming a coating on the fertilizer, wherein the coating comprises aluminum, iron, aluminum-calcium sulfate, calcium sulfate, ferrous ammonium phosphate, sulfur, and/or an aluminum-iron complex; and drying the coated fertilizer.

62. The method of claim 61, wherein the acidic pH is less than about 6.8.

63. The method of claim 61, wherein the coated fertilizer, as compared to fertilizer not so processed:
has reduced dust formation;
is less absorbent to humidity;
is resistant to self-heating; and/or
has a reduced odor.

64. The method of claim 61, wherein the surfactant comprises dodecylbenzyl sulfonic acid (DBSA), an ethoxylated alcohol of C10-C16, sodium lauryl ether sulfate, amine oxide, methyl salicylate, coco betaine, an anionic, cationic, or nonionic surfactants, or mixtures thereof.

* * * * *